(12) United States Patent
Simpson et al.

(10) Patent No.: US 9,378,658 B2
(45) Date of Patent: Jun. 28, 2016

(54) SYSTEMS AND METHODS FOR TRAINING META-ATTENTION

(71) Applicants: Gregory V. Simpson, San Anselmo, CA (US); David E. Charron, Piedmont, CA (US)

(72) Inventors: Gregory V. Simpson, San Anselmo, CA (US); David E. Charron, Piedmont, CA (US)

(73) Assignee: Think-Now Inc., San Francisco, CA (US)

( * ) Notice: Subject to any disclaimer, the term of this patent is extended or adjusted under 35 U.S.C. 154(b) by 89 days.

(21) Appl. No.: 13/933,024

(22) Filed: Jul. 1, 2013

(65) Prior Publication Data

US 2014/0017645 A1    Jan. 16, 2014

Related U.S. Application Data

(60) Provisional application No. 61/667,413, filed on Jul. 2, 2012.

(51) Int. Cl.
*G09B 19/00* (2006.01)
*G09B 23/28* (2006.01)
*G09B 7/00* (2006.01)

(52) U.S. Cl.
CPC . *G09B 23/28* (2013.01); *G09B 7/00* (2013.01)

(58) Field of Classification Search
USPC .................................................. 434/236, 238
See application file for complete search history.

(56) References Cited

U.S. PATENT DOCUMENTS 6,402,520 B1 *   6/2002   Freer ............................. 434/236

* cited by examiner

*Primary Examiner* — Kesha Frisby
(74) *Attorney, Agent, or Firm* — Kang S. Lim

(57) ABSTRACT

A meta-attention trainer for enhancing the meta-attention of a user. The trainer includes a processor coupled to a display device. The display device presents the user with a cognitive task that includes a stimuli. The cognitive task specifies a desired response to the stimuli. The processor assesses attentional control of the user in relation to the cognitive task, and generates an instruction and/or a feedback, based on the attentional control assessment, to the user, thereby enabling the user to reflect on the meta-attention of the user.

31 Claims, 14 Drawing Sheets

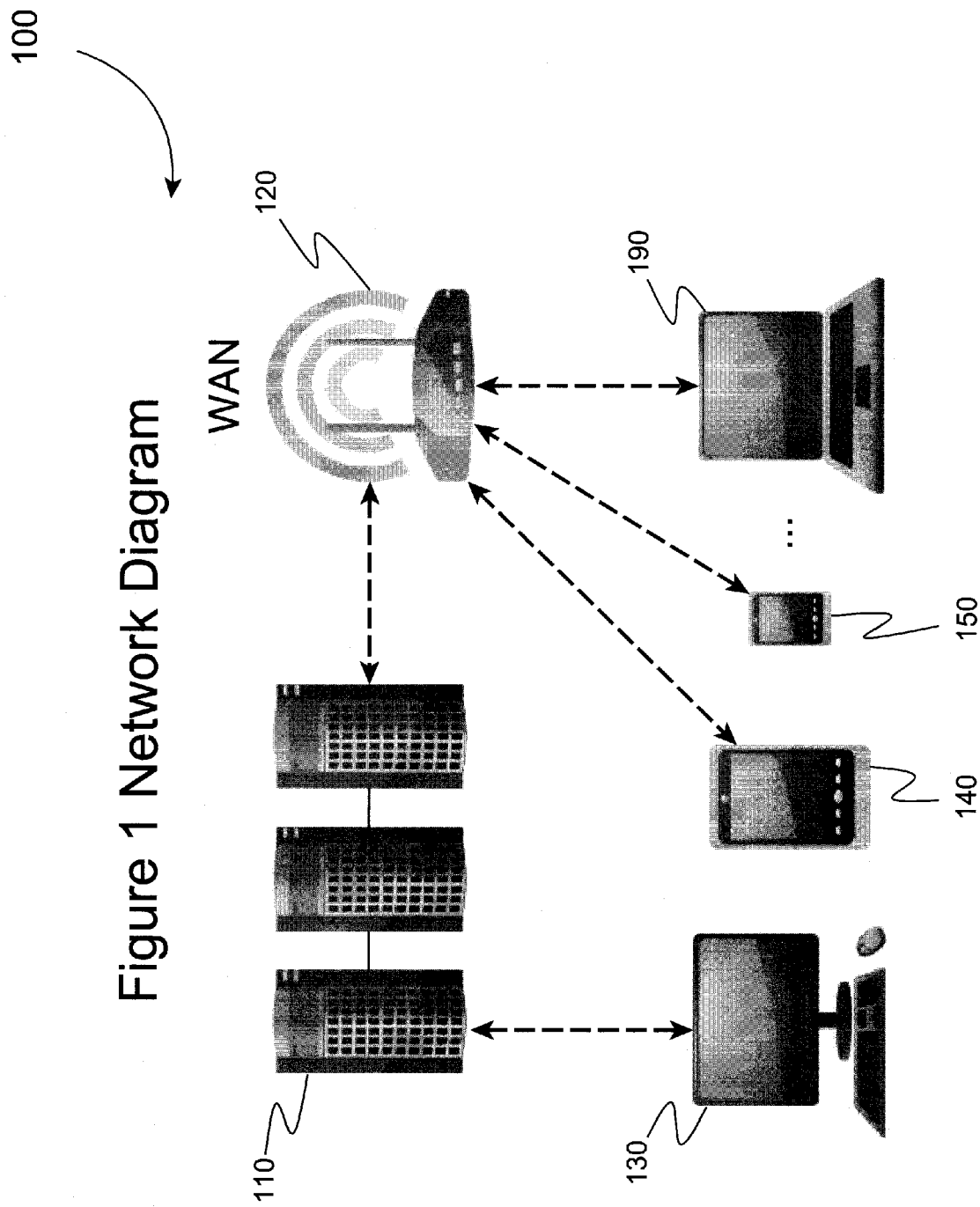
Figure 1 Network Diagram

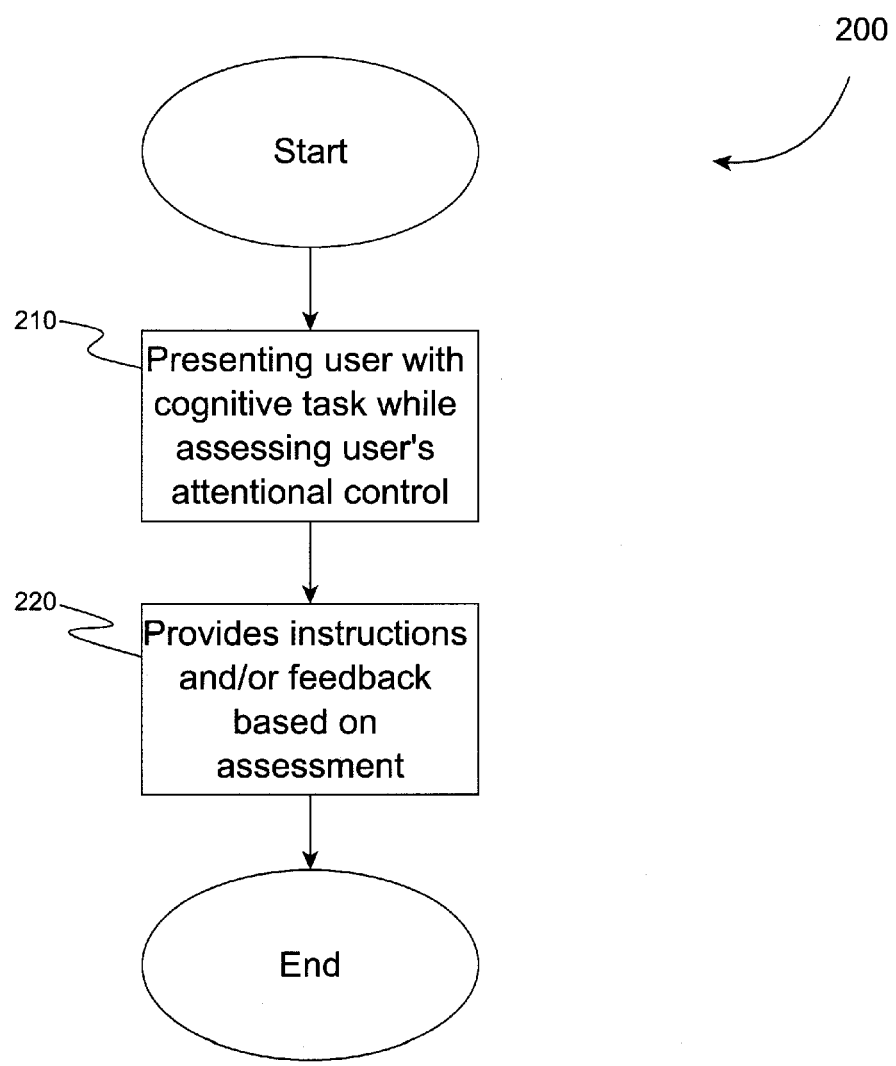
Figure 2: System/Method for Training Meta-Attention

Figure 3 Non-Compelling AttentionTraining
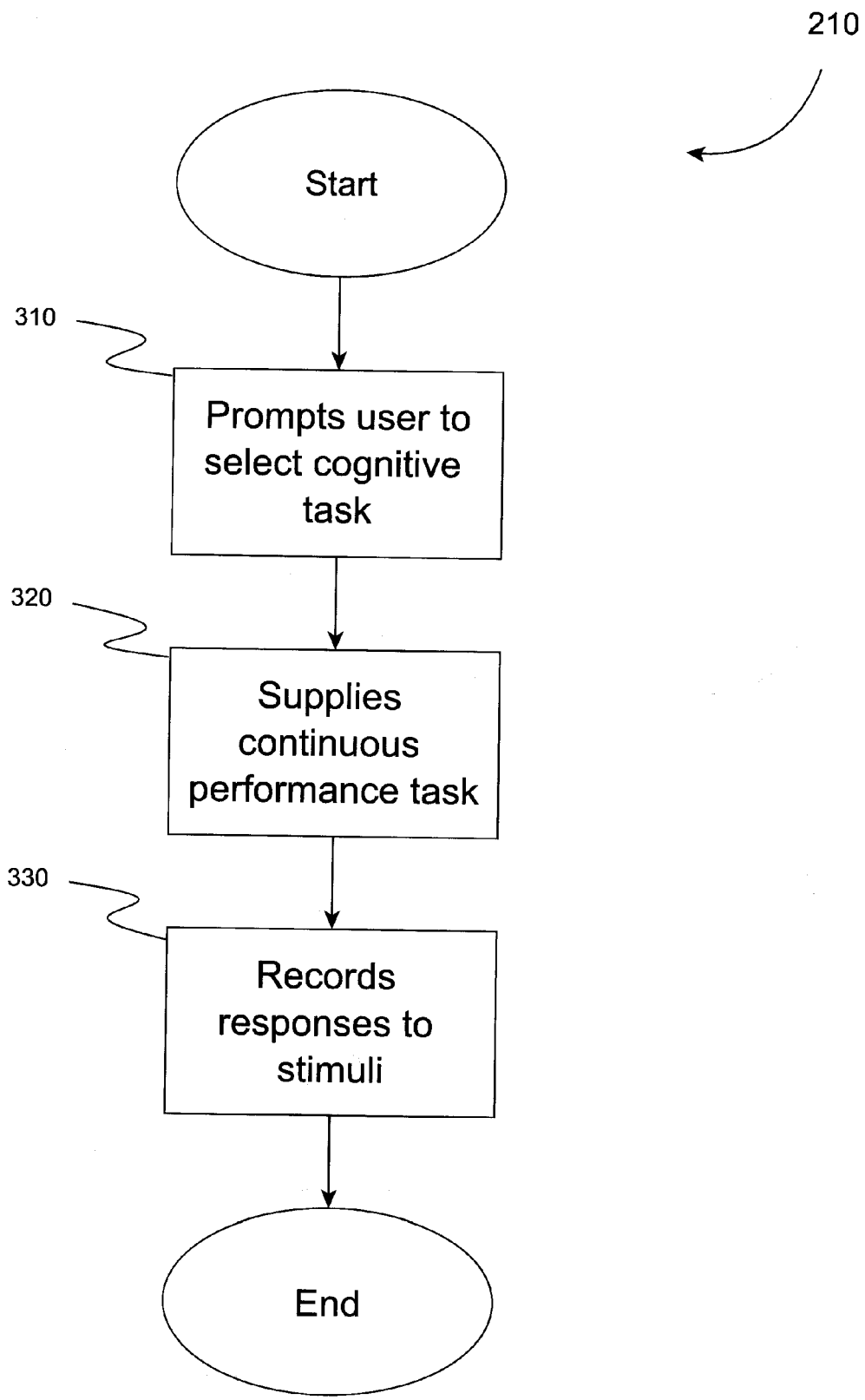

Figure 4 Continuous Performance
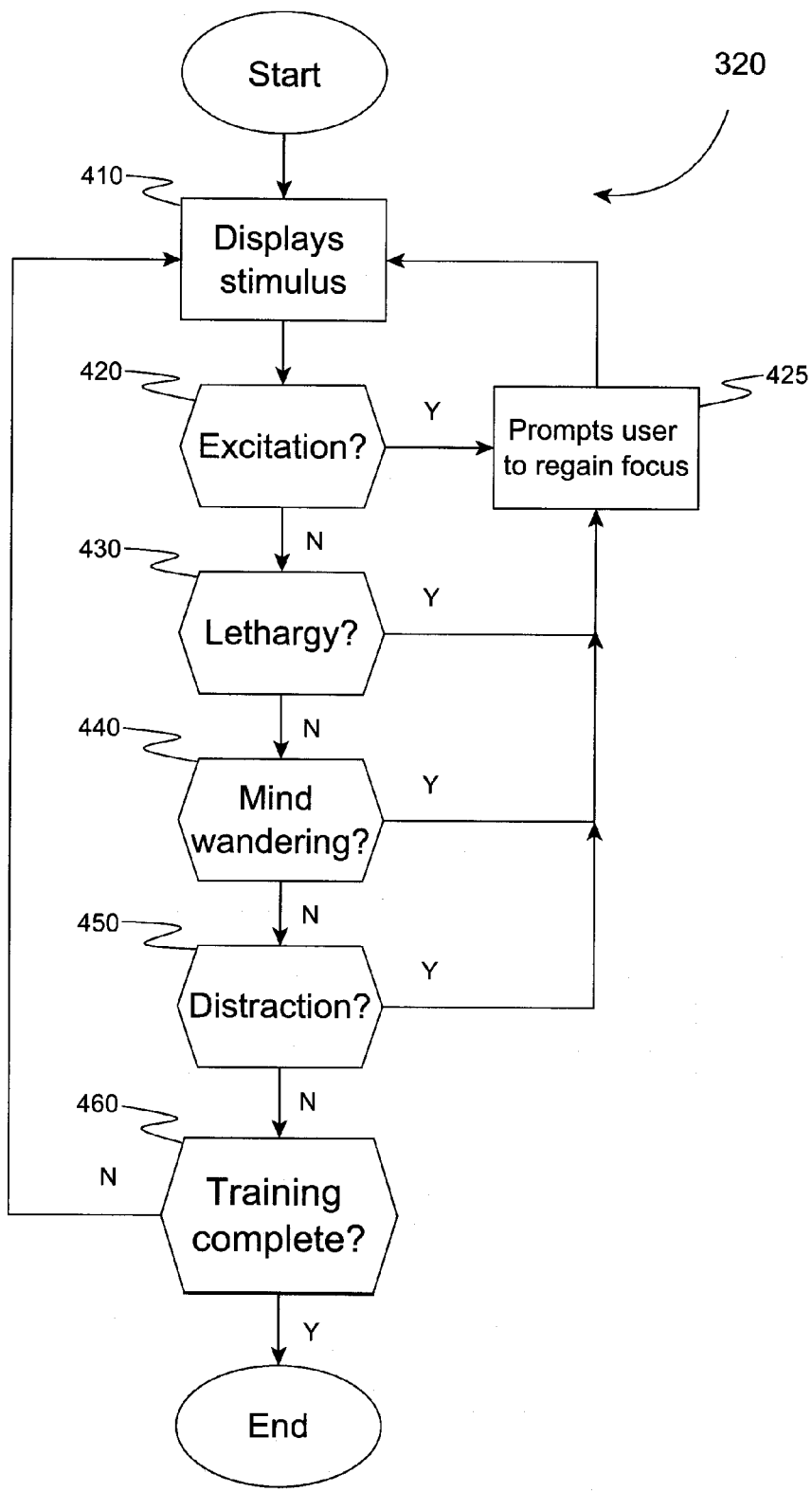

Figure 5 Inhibition of Response Attention Training Task
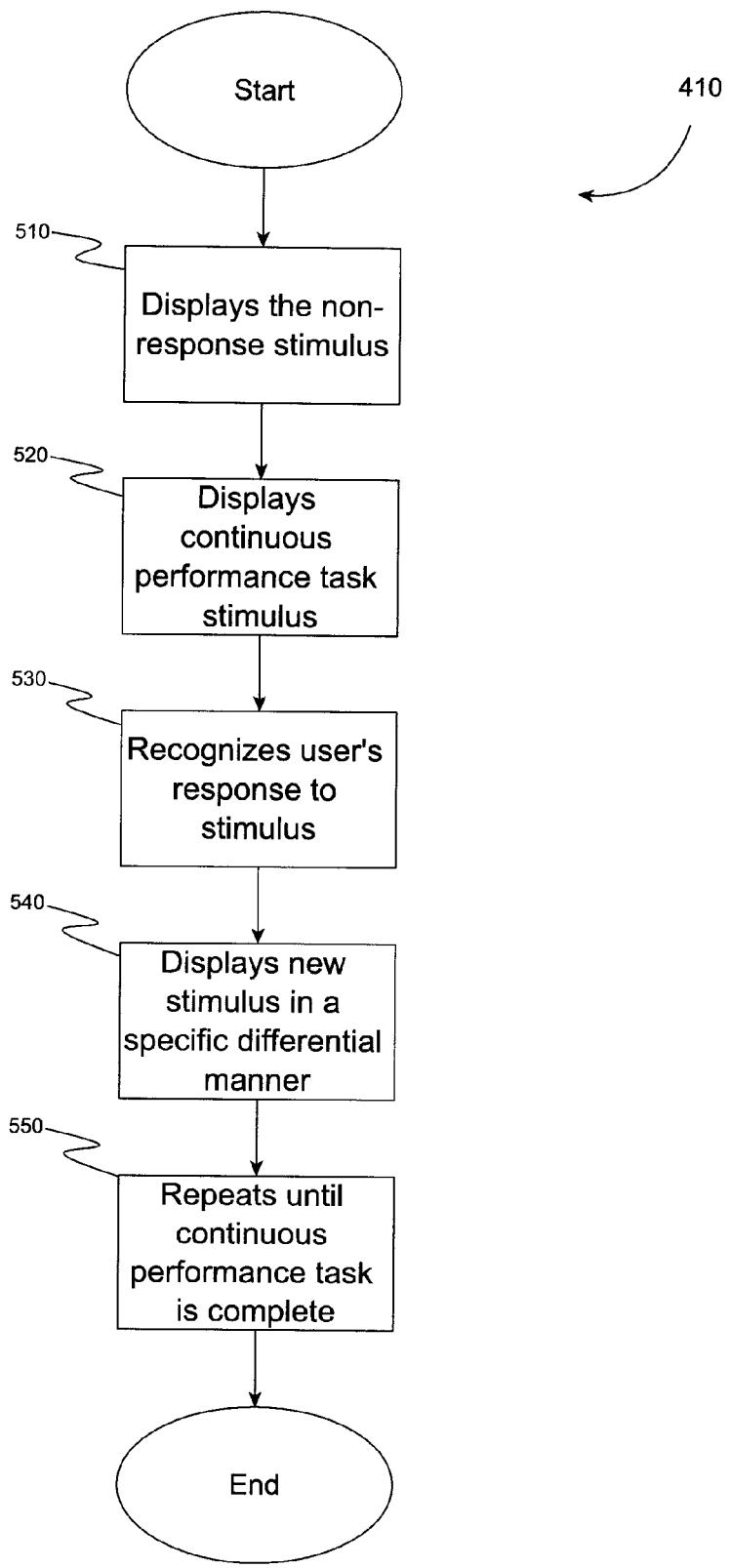

Figure 6 Low Variance of Response Time Attention Training Task
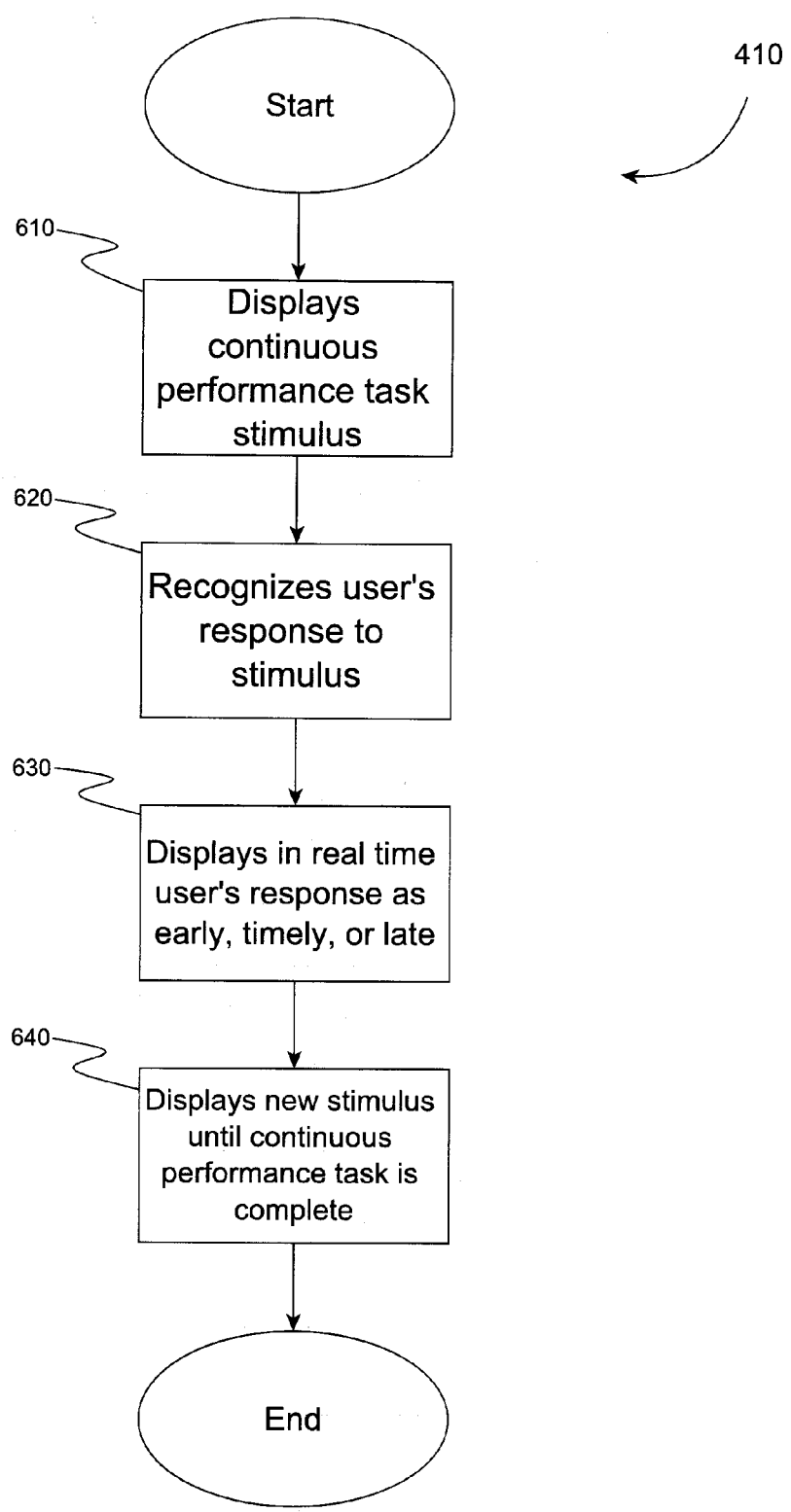

Figure 7 Timing Specificity Attention Training Task
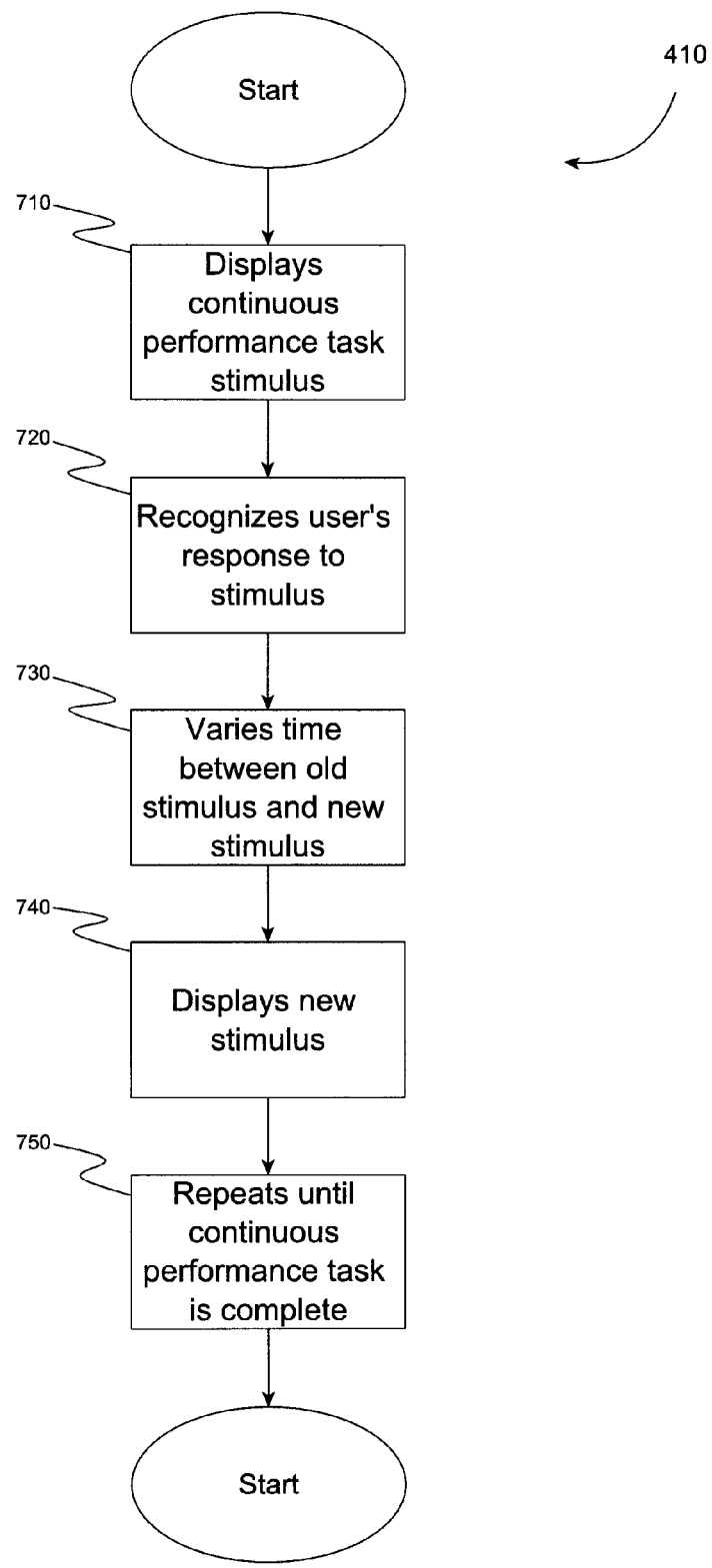

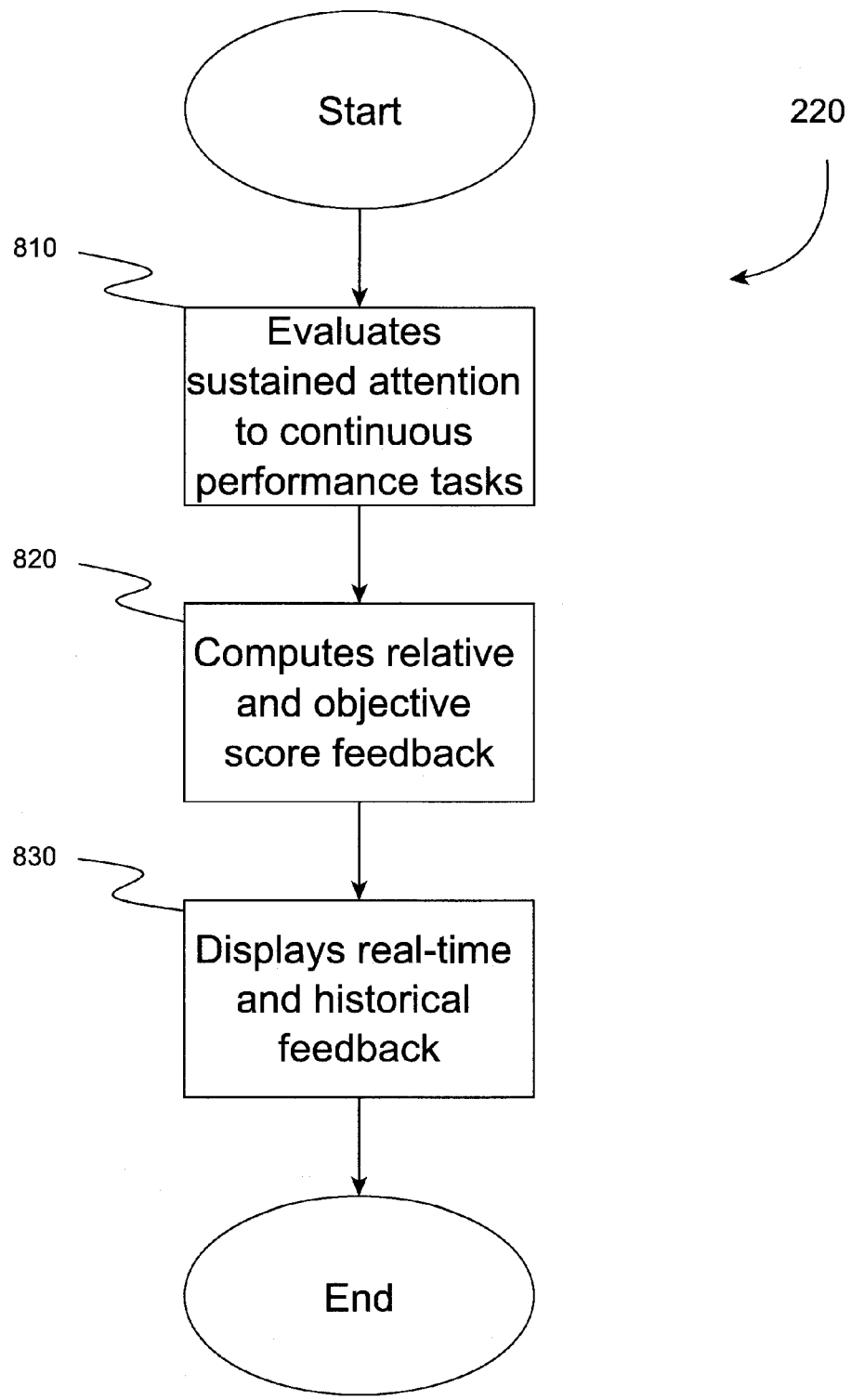
Figure 8 Feedback

Figure 9 Inhibition of Response Results Evaluation
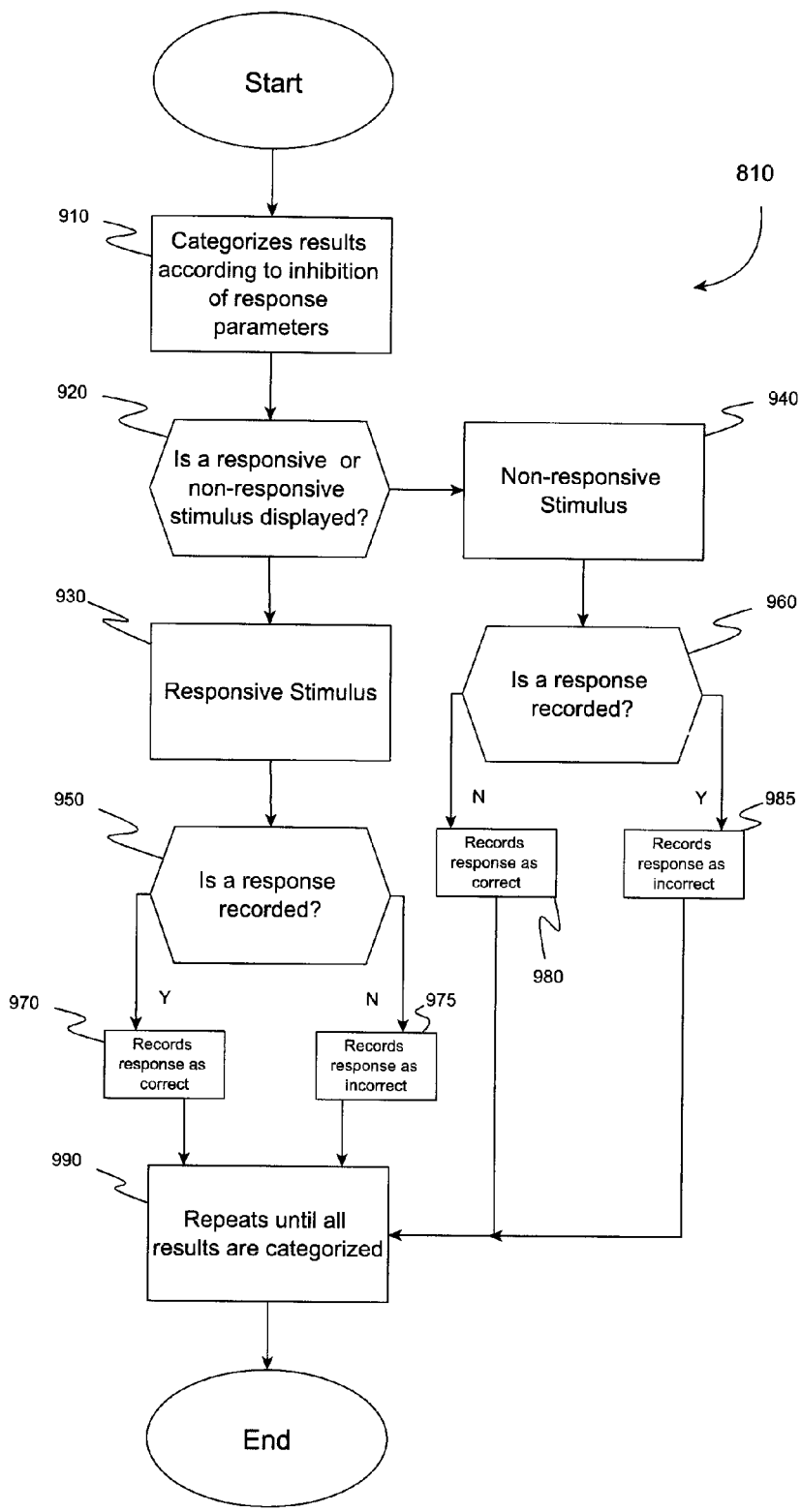

Figure 10 Low Variance of Response Results Evaluation
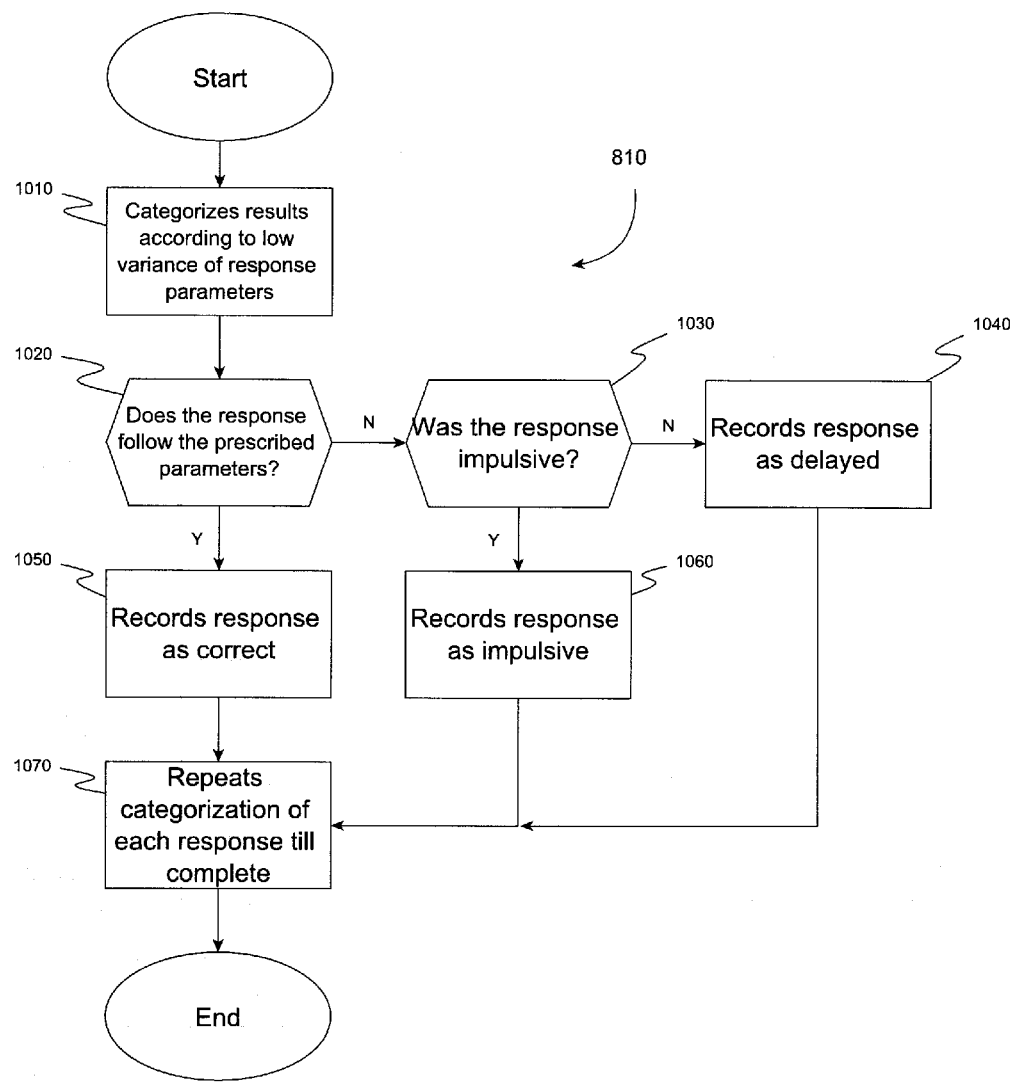

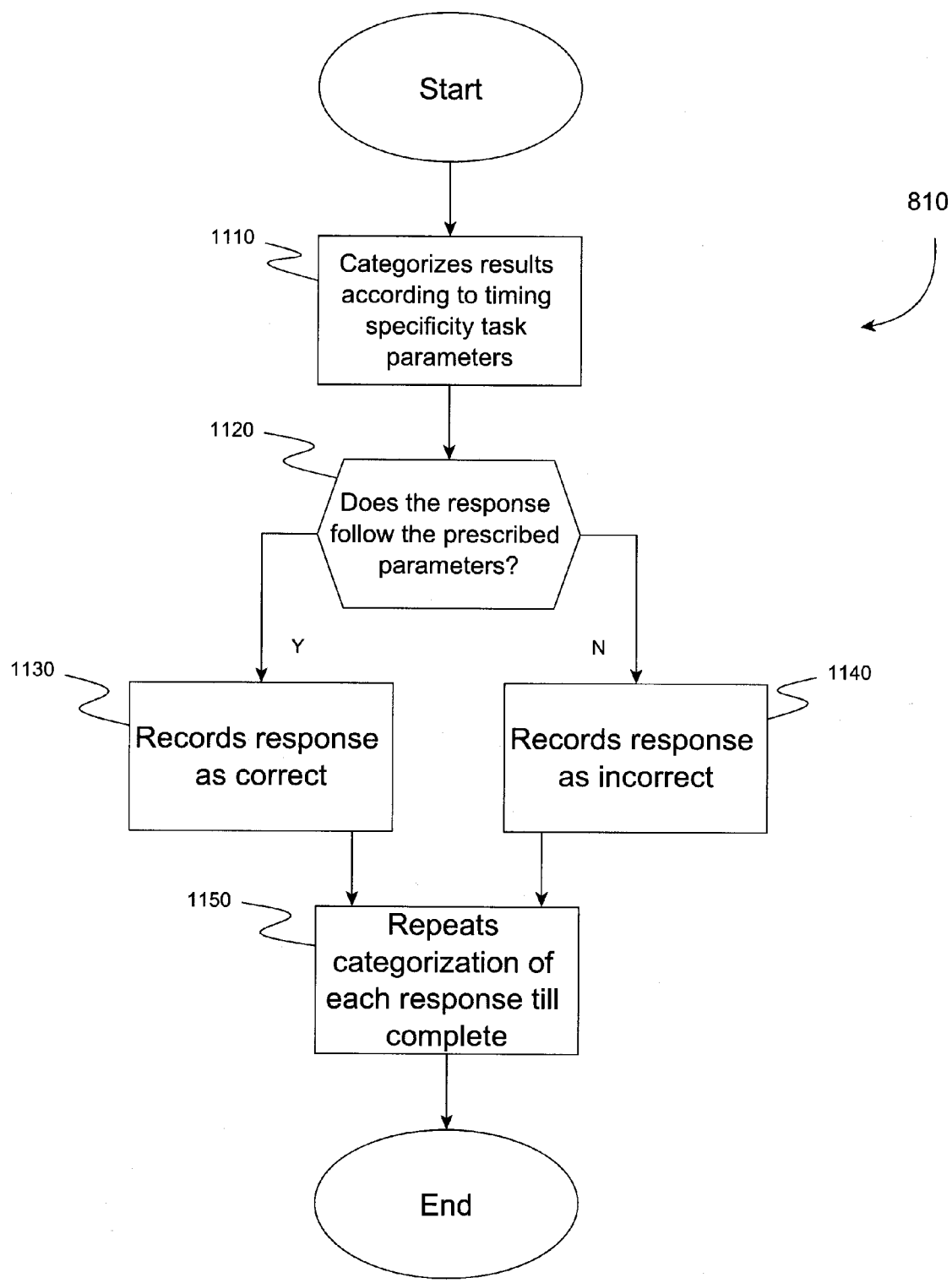
Figure 11 Timing Specificity Results Evaluation

Figure 12 Screenshots of Inhibition of Response
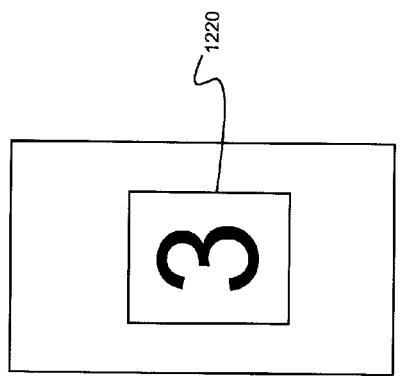
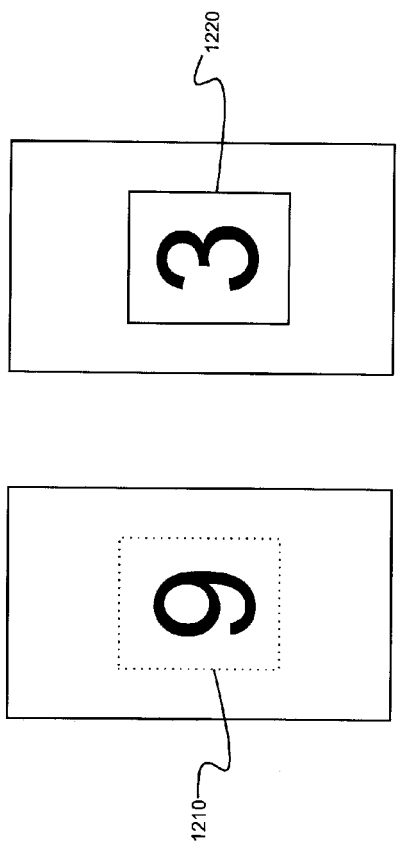
Fig. 12A
Fig. 12B
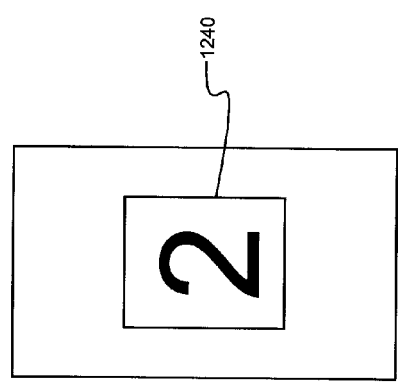
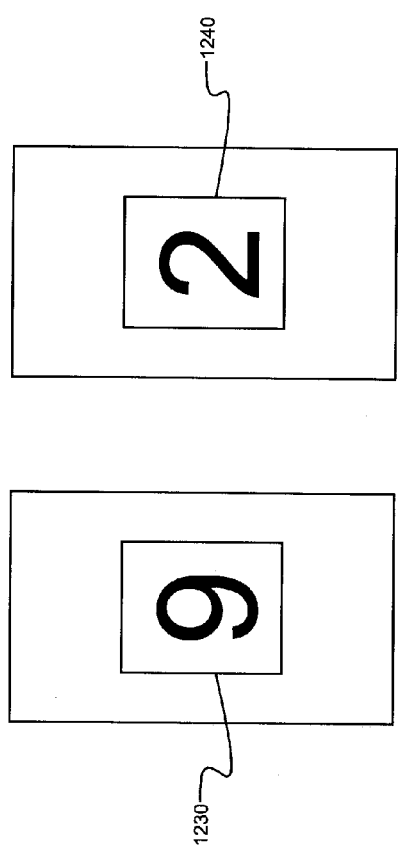
Fig. 12C
Fig. 12D Figure 13 Screenshots of Low Variance of Response Time

Figure 14 Screenshots of Timing Specificity

SYSTEMS AND METHODS FOR TRAINING META-ATTENTION

CROSS REFERENCE TO RELATED APPLICATION

This non-provisional application claims the benefit of provisional application No. 61/667,413 filed on Jul. 2, 2012, entitled "Systems and Methods for Training Meta-Attention", which application and is incorporated herein in its entirety by this reference.

BACKGROUND

The present invention relates in general to the field of cognitive training, and more specifically to a computer program for cognitive training techniques for training Meta-attention. Meta-attention can be described as knowledge of the factors that influence one's attention and an awareness of one's attentional processes as they occur. Control over attentional processes can only be improved if one has Meta-attention. The actual control mechanisms exist in the brain, and if an individual is made aware of these mechanisms, then the individual becomes capable of using them. The individual's self does not become conscious, but the individual can apply the controls consciously. Thus, it is essential to be able to bring one's mind to a state, in which one notices attentional processes, and to do so repeatedly, in order to observe the results of attentional control and gradually learn to use them when needed. This invention would allow individuals the opportunity to train their Meta-attention and achieve higher attentional control. Such an invention would be useful to normal populations as well as individuals with a wide-range of attention related cognitive disorders including but not limited to stress, anxiety, social anxiety disorder, depression, ADHD, Autism-Asberger's, Schizophrenia, TBI, PTSD and stroke.

It is therefore apparent that an urgent need exists for training Meta-attention. This invention allows for an individual to determine one's Meta-attention level. Moreover, an individual can use this invention to train one's Meta-attention. This invention is designed to provide cognitive training to alleviate disorders of attention by helping users gain control of their attention through Meta-attention. This invention is designed to both teach and train users how to approach control and release from attention for the benefit of one's well-being. The benefits of this invention are not limited to individuals with attention disorders. Individuals without attention disorders could benefit from this invention by training their attentional control or a person's ability to volitionally control and direct their selective and sustained attention.

Cognitive training relates to how experiences and training cause change in the neurology and behavior of individuals. Neuroscience has shown that minimal repetitive and directed activities can have significant impact on the human maladies and performance. That impact not only appears on pre- and post-tests administered to individuals to measure behavioral changes but also through modern imaging techniques such as fMRI and EEG.

Our everyday activities also drive cognitive changes. Those activities might be intentional, like learning how to play tennis or how to speak a new language, but also unintentional such as the formation of habits. It is the intention of our training to bring a specific set of skills related to attention and attentional control back to a normal range of intentional control with the goal to enhance health and performance.

Cognitive training exists in many different forms including simple practice and repetition of activity with intentional goals in a therapeutic or coaching setting to computer directed tasks that are highly controlled, systematic, and adaptive to the individual. Tasks are any set of stimuli and related cognitive activities that require cognitive or behavioral responses by an individual. With the advent of mobile computing systems, many software programs for cognitive training are now available to individuals as they progress through their day, also known as in situ availability.

Many cognitive training programs focus on specific recognition tasks or memory tasks. Focus is the quality of a person's attentional control to appropriately accomplish a task. It is the objective of this invention to train higher level of cognitive skills commonly referred to as executive function. Specifically the invention directs cognitive training techniques at Meta-attention. Such knowledge and awareness are required for improving these processes through training Attentional control can be described as an individual's ability to control at least three specific components of attention. The first is selective attention, or the ability to focus cognitive resources on a specific object or task. More specifically, selective attention is the preferential cognitive processing of relevant information over irrelevant information without distraction. Selective attention can be thought of as being focused on one thing to the exclusion of other external events or internal thoughts. Selective attention is transient and requires effort to maintain, with or without the presence of competing distracters. Control of selective attention allows an individual to direct their energies and resources intentionally.

Secondly, attentional control requires the ability to suppress the misdirection of attentional resources to distraction. This skill relates to an individual's ability to recognize interruptions and new alternate demands for attentional resources and then to intentionally direct their attention and focus to the desired task.

Thirdly, attentional control relates to an individual's ability to sustain their selective attention and distraction suppression over time. The ability to sustain attention is a cognitive control issue that relates to a person's awareness of their waxing and waning of attentional resources over time, i.e., lethargy; excitation; switching . . . .

Attentional control is directly useful in everyday life where individuals focus on accomplishing tasks in the face of new information constantly arising and acting as a distraction. Certain individuals may naturally deal with these circumstances without significant impact and will live generally happy lives in full control. However, many individuals cannot directly manage the control and experience aspects of cognitive disorders such as stress, anxiety and depression.

Other cognitive training companies have produced software that attempt to train various aspects of cognition. All of these software programs use computers to train certain aspects of cognition such as response to specific situations.

Certain training simulators such as police academy training and flight trainers rely on vigilance by the individual to successfully complete their tasks. These simulators present vigilant tasks in conjunction with recognition activities to train individuals' specific skills when confronted with specific situations.

Computer games provide rewarding tasks that require the user to play for lengths of time. The rewards create a continuous game play situation. Games such as Tetris provide incentives for the individual to play continuously. The incentives include increasing difficulty, faster game play, and better score.

Meditation and mindfulness training often begin by training a person's attention through focus on environmental noises, including breathing and then to recognize distractions and cognitive functions. These training techniques are introspective, meaning coaches and teachers cannot directly or objectively determine the skills and abilities of the trainees.

Psychological testing also measures attention using continuous performance tasks related to the recognition of stimuli and response inhibition. Stimuli are objects in any sensory domain that can be perceived by an individual. Continuous performance tasks are psychological tasks that measure a person's sustained attention, or ability to maintain consistent focus on an activity or task without being distracted, and selective attention and impulsivity, or inclination of an individual to initiate behavior without adequate forethought as to the consequences of their actions. A person performs the task for a sustained period (usually several minutes) while stimuli are delivered "continuously" without a break. Each stimulus is evaluated according to either a user's response or withholding of response.

SUMMARY

By using computer driven behavioral activities linked with feedback, our invention directly improves a user's awareness of attentional control, or Meta-attention, and increases their attentional control and ability to suppress distraction. The computer driven behaviors require the user to fully engage their attention on the activity at a high level while the computer closely monitors their behavior. Feedback is used to reinforce a user's understanding and awareness of their performance and abilities. Attentional control derives from an individual's awareness of their capabilities and practice and improvement at control from trial and error.

In one embodiment of the invention, we use difficult to perceive stimuli that a user may not perceive if their attention wanders. By putting this type of stimulus in a computer game that requires constant vigilance by the user, the user brings all of their attention resources to maintaining focus on the training task. This use of attentional control exercises the executive control function related to attention directly and gives the user the understanding for what it means to obtain control of their attention. The invention also includes multiple levels of feedback that provide real-time, immediately post-play, and later-reflective data on the user's performance. Feedback is how the user learns about their ability to control attention. Training an individual to use a combination of the abilities to focus and to suppress distraction using self-directed behavior is the objective of the invention. Self-directed behavior is when an individual specifically exercises attentional control. This invention can also be used to diagnose attentional problems such as ADHD or other specific issues related to attentional control.

It is a goal of this invention to provide a computer driven activity that directly improves an individual's ability to control aspects of their attention through self-directed behavior. Self-directed behavior relates to a person's ability to control their emotions, stress, anxiety, depressive tendencies, and recovery among other health and wellness related functions through their own activities. Further, the invention provides objective absolute and relative scores (longitudinal and normative) that can be used to rate and better understand the attentional abilities of individuals and groups. The embodiment is further designed to be effective at improving attention when used in repetitive single sessions approaching 30 seconds. In the end, the user's increased attentional awareness (meta-attention) will enable them to generalize, or the ability of an individual to apply the attentional control developed through training on one set of tasks to other non-trained tasks throughout the individual's daily life.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 1 is a block diagram of a desktop computer, tablet, Smartphone, and laptop connected through the internet to remote servers, in accordance with some embodiment;

FIG. 2 is a block diagram showing a system and method for training Meta-attention, in accordance with some embodiment;

FIG. 3 is a block diagram showing a system and method of non-compelling attention training, in accordance with some embodiment;

FIG. 4 is a block diagram showing a system and method for continuous performance during attention training, in accordance with some embodiment;

FIG. 5 is a block diagram showing a system and method for inhibition of response in a Cognitive Task, in accordance with some embodiment;

FIG. 6 is a block diagram showing a system and method of low variance of response time in a Cognitive Task, in accordance with some embodiment;

FIG. 7 is a block diagram showing a system and method of timing specificity in a Cognitive Task, in accordance with some embodiment;

FIG. 8 is a block diagram showing a system and method for determining the feedback post a Cognitive Task, in accordance with some embodiment;

FIG. 9 is a block diagram showing a system and method for evaluating the inhibition of response results from a Cognitive Task, in accordance with some embodiment;

FIG. 10 is a block diagram showing a system and method for evaluating the low variance of response results from a Cognitive Task, in accordance with some embodiment;

FIG. 11 is a block diagram showing a system and method for evaluating the timing specificity results from a Cognitive Task, in accordance with some embodiment;

FIG. 12 is simulated screen shots of the inhibition of response in a Cognitive Task;

DETAILED DESCRIPTION

Figure 13A:
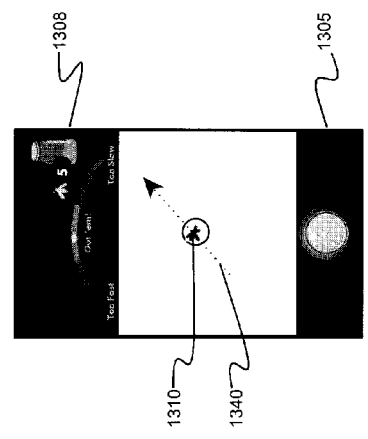
FIG. 13 is simulated screen shots of the low variance of response time in a Cognitive Task.
Figure 13B:
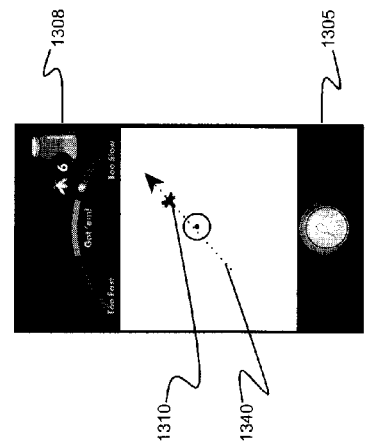
Figure 13C:
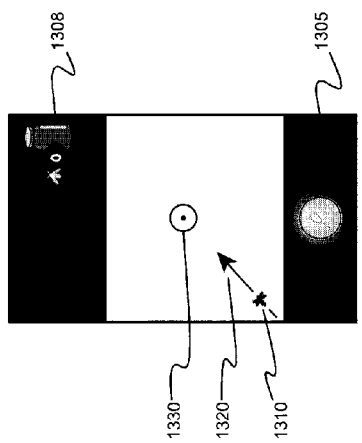
Figure 13D:
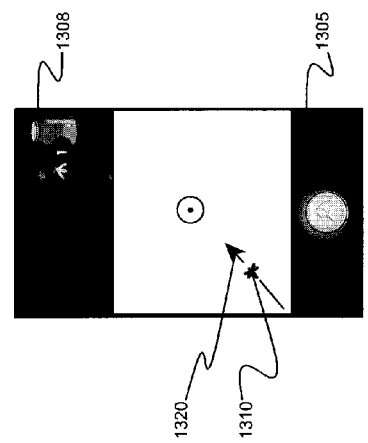

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for training an individual's Meta-attention. Cognitive Tasks are designed to improve a person's Meta-attention and attentional control. The training program uses the techniques enumerated below to drive a user to experience all forms of attentional state change and control. The user's performance can be monitored through real-time and/or periodically and feedback can be provided relative to the user's history and/or compared to other users.

Referring to FIG. 1, a training system 100 is shown for executing a computer program to train, or retrain a cognitive training program according to the present invention. The training system 100 contains a server 110, which allows a user to remotely access the Cognitive Tasks and results over the cloud. The servers 110 maybe connected through local area network (LAN) (not shown), a wide area network (WAN) 120 or via modem connections, directly or through the internet; however, connection to the internet or a server is not required for the invention to be effective. The user may use any of the following devices but training is not limited to the following: 1) a desktop computer system 130, 2) a tablet computer 140, 3) Smartphone or other small portable handheld device 150, and 4) laptop computer 160. The desktop computer 130 contains a mouse, keyboard, and monitor attached to a computer containing a computer processing unit (CPU), hard disk, and CD ROM (not shown). The laptop computer 160 contains a display screen, internal CPU, keyboard, and touchpad. The monitor in 130 and displays screens of 140, 150, and 160 allow the user to see the stimuli. The mouse in 130 and touchpad of 160 allow the user to select the stimuli according to the specific Cognitive Task. While the display screens of the tablet computer 140 and handheld device 150 allow the user to directly select the stimuli according to the specific Cognitive Task. The computer network 100 allows information such as the training, test scores, statistics, and other information to flow from any device 130, 140, 150, and 160 to a server 110. Although a number of different computer platforms are applicable to the present invention, embodiments of the present invention execute on tablet computers or handheld devices running the Android operating system.

Now referring to FIG. 2, the block diagram shows a system and method for attaining Meta-attention 200. Meta-attention is defined as knowledge of the factors that influence one's attention and an awareness of one's attentional processes as they occur. Such knowledge and/or awareness of attention are required for improving these processes through training Meta-attention is trained through being presented with a Cognitive Tasks while the training system assesses the user's attentional control 210 and receiving instructions and/or feedback 220. The assessment of the user's attentional control can occur continuously or periodically. Moreover, the non-compelling Cognitive Tasks 210 are any type of computer controlled and goal driven training tasks that require the user to focus on a Cognitive Task according to the prescribed rules. The instructions and/or feedback results 220 are the reactions and responses to a particular non-compelling Cognitive Task. Moreover, the instructions and/or feedback results 220 can include, but are not limited to real-time scoring, post-training play scoring, historical statistics, and guidance for reflecting on the meaning of the feedback with respect to meta-attention.

FIG. 3 is a block diagram detailing a non-compelling Cognitive Task 210. Each non-compelling Cognitive Task proceeds in the same fashion, 1) the user is prompted to select a Cognitive Task 310, 2) a continuous performance task is presented to the user 320, and 3) the responses to the stimuli are recorded 330. The Cognitive Tasks 310 are any computer controlled, goal driven training task. The Cognitive Tasks 310 are computer controlled meaning they run on any of the computer platforms described above in FIG. 1. The Cognitive Tasks 310 are also goal driven. The activity produces a score that represents to the user their skill at attentional control and then links that score to the user's desire to be in better control of their attention. The Cognitive Tasks 310 are best accomplished through continuous performance tasks 320. A continuous performance task 320 is one that does not allow the user to disengage from the Cognitive Task without incurring a performance/score decline. A continuous performance task 320 is important because it continuously engages the parts of the brain that are central to the Meta-attention training.

FIG. 4 is a block diagram specifically describing the continuous performance task 320. Each continuous performance task occurs in the same manners. First, the Cognitive Task displays a stimulus 410. The stimuli displayed 410 can occur according to, but is not limited to three specific manners; 1) inhibition of response, 2) low variance of response time, or 3) timing specificity. Then the user responds or does not respond according to the prescribed directions or based upon the type of Cognitive Task 310 chosen. No response by the user could be due to several situations. The first is as previously described; the stimulus does not require a response as per the prescribed directions. On the other hand, no response could be due to a failure to respond because of various uncontrolled behaviors such as excitation 420, lethargy 430, mind wandering 440, and distraction 450. While FIG. 4 has these four states (excitation 420, lethargy 430, mind wandering 440, and distraction 450) listed in this particular order, no specific order is required in the continuous performance task 320. Excitation 420 occurs when the focus of attention drifts away from the Cognitive Task to successive specific thoughts or external stimuli, such that the user's attention is continuously changing from one thought to another. Lethargy 430 is a state of mind that includes sluggishness, inactivity and/or apathy. Lethargy 430 afflicts individuals when the activity they should be doing becomes boring and repetitive. Mind wandering 440 is where the focus of attention drifts away from the Cognitive Task to another specific set of thoughts or set of externalities. Distractions 450 are external stimuli that cause the user to lose focus on the continuous performance task. More specifically, distractions are the unintentional movement of attention away from the intended focus that is caused by task irrelevant thoughts (internal distracters) or environmental events (external distracters). During the continuous performance task 320, the training task may prompt the user to regain focus 425 because the user has failed to respond to multiple stimuli. The Cognitive Task can repeat displaying stimuli 460 until the prescribed time period has occurred; however, the continuous performance tasks are not limited to the prescribed times. The continuous performance tasks may conclude after a predetermined number of correct and/or incorrect responses.

FIG. 5 is a block diagram describing one version of 410 according to the inhibition of response Cognitive Task. This specific Cognitive Task requires the user to respond to stimuli in a specific differential manner infrequently Inhibition of response Cognitive Task indicates how well a user can control his/her attention. The Cognitive Task occurs in the following manner: 1) the non-responsive stimulus 510 is displayed, 2) the training task begins with a stimulus 520, 3) the user recognizes whether the stimulus requires a response, responds accordingly, and that response is recorded 530, 4) a new stimulus is displayed in a specific differential manner

540, and 5) stimuli are continuously displayed until the performance task is complete 550.

The following example describes the inhibition of response Cognitive Task FIG. 5. The training system displays a number between 0-9, which is the non-response stimulus 510. The training task begins and a number between 0-9 is displayed 520. The user recognizes the number as being either the non-response stimulus or not. The training system can recognize whether the user responds to the stimulus, e.g. touches the screen or does not touch the screen 530. After the response the training system can show a new number between 0-9 540. Once again the user responds according to whether the number displayed is the non-responsive stimulus or not. The training continues for a prescribed amount of time or until the user has a prescribed number of incorrect responses 550.

FIG. 6 is a second block diagram version of 410 describing the low variance of response time Cognitive Task. Low variance of response time Cognitive Task reveals consistency of focus, which is a critical factor that indicates attentional control. The low variance of response time Cognitive Task occurs in the following manner: 1) a stimulus is displayed 610, 2) a response is recorded 620, 3) in real-time, the training system displays the response as early, timely, or late 630, and 4) the Cognitive Task continues for the prescribed amount of time 640.

The following example describes the low variance of response time Cognitive Task FIG. 6. An image of a firefly enters from any side of the display screen 610. The user focuses on the firefly and touches the screen as it passes through a specific, highlighted spot on the display screen 620. In real-time the training system can inform the user as to whether the user's response was timely, early, or late 630. The training system can display a new firefly and repeat until the Cognitive Task is complete 640. Throughout the Cognitive Task, the firefly can flash on and off, requiring the user to maintain a consistency of response, whether the stimulus is visible or not, and determine when to touch the screen.

FIG. 7 is a third block diagram version of 410 describing the timing specificity Cognitive Task. The ability of an individual to specifically modify their response time on demand indicates superior control of the Meta-attention. The timing of specificity Cognitive Task occurs in the following manner: 1) a stimulus is displayed 710, 2) a response is recorded 720, 3) the timing between the new stimulus and old stimulus varies according to preset parameters 730, 4) a new stimulus is displayed 740, and 5) the Cognitive Task is repeated for a prescribed period of time 750. One embodiment of the timing specificity Cognitive Task is one that utilizes a specific detection task to capture the attention of the user. That Cognitive Task presents a visual Gabor patch on a visual background where the Gabor patch intensity is at or near the user's perceptual threshold. Perceptual threshold is set at the point where the presented stimuli are slightly above the intensity that would cause the user to not perceive them. Consequently, the user is required to determine if he/she has seen a stimulus and respond accordingly.

The following example describes the timing specificity Cognitive Task FIG. 7. The display screen has a ripple, concentric circle like pattern with slight variation in color from the peaks to the troughs of the waves. The Cognitive Task displays a stimulus which is a patch of light, also known as a Gabor patch, which is slightly brighter than the background 710. This type of stimulus is called a near-threshold stimulus. The near-threshold stimulus is slightly above a person's perceptual threshold or the level of stimulus salience that is just enough to be perceived. The user taps anywhere on the screen after the stimulus is displayed and before the next stimulus. The system records whether or not the user responded 720. The Cognitive Task varies the timing between the old stimulus and the new stimulus 730. A new stimulus is displayed 740 and the Cognitive Task repeats for three minutes or until the user makes three incorrect responses 750.

FIG. 8 is a block diagram describing the second step of a system for attaining Meta-attention 200, the feedback mechanism 220. The feedback is important because it provides information to the user so that the user may better understand one's attentional abilities including attentional control as compared to oneself and compared to all those that have participated in the Cognitive Tasks. The feedback mechanism 220 occurs in a three step process. The first step requires evaluating the responses from the different Cognitive Tasks 810. Second, the training system computes the relative and objective scores (longitudinal and normative) 820. Third, the training system displays any real-time and historical feedback 830.

FIG. 9 is a block diagram of the feedback evaluation 810 describing the inhibition of response results evaluation. The training system categorizes each response according to the stimulus previously displayed 910. For each inhibition of response stimulus, the training system determines whether a responsive or non-responsive stimulus was displayed 920. If a responsive stimulus was displayed 930, the training system determines if a response was recorded 950. If a response was recorded then the training system marks that response as correct 970 and repeat evaluating the remainder of responses 990. If the training system did not record a response and a responsive stimulus were displayed 930, then the training system marks that response as incorrect 975. Once again, the training system continues evaluating the remainder of the responses till all responses are categorized 990. If the training system displays a non-responsive stimulus 940, the training system determines if a response was recorded 960. If a response was recorded then the training system marks that response as incorrect 980 and repeat evaluating the remainder of responses 990. If the training system did not record a response and a non-responsive stimulus was displayed 940, then the training system marks that response as correct 985. Once again, the training system continues evaluating the remainder of the responses till all responses are categorized 990.

FIG. 10 is a block diagram of the feedback evaluation 810 describing the low variance of response results evaluation. The training system categorizes each response according to the low variance response parameters 1010. For each low variance of response recorded, the training system determines if the response recorded followed the prescribed parameters 1020. If the response recorded follows the low variance of response parameters, then the training system marks the response as correct 1050 and the training system continues evaluating the remainder of the responses till all responses are categorized 1070. If the recorded response was not according to the low variance of response parameters, then the training system determines if the response was impulsive 1030 or delayed 1040. An impulsive response is a behavior in which the user does not have the forethought as to the consequences of one's actions, acting on the spur of the moment. If the response was before the low variance of response parameters, then the training system records the response as impulsive 1060. The training system continues evaluating the remainder of the responses till all responses are categorized 1070. If the response was after the low variance of response parameters, then the training system records the response as delayed

1040. The training system continues evaluating the remainder of responses till all the responses are categorized 1070.

FIG. 11 is a block diagram of the feedback evaluation 810 describing the timing specificity results evaluation. The training system categorizes each response according to the timing of specificity task parameters 1110. The training system determines whether or not a stimulus was displayed 1120. If a stimulus was displayed and the user responded, then the training system records the response as correct 1130. The training system continues evaluating the remainder of the responses till all the responses are categorized 1150. If a stimulus was displayed and the user did not response, then the training system records the response as incorrect 1140. The training system continues evaluating the remainder of the responses till all the responses are categorized 1150. On the other hand if no stimulus was displayed and the user responded to what he/she perceived as a stimulus, then the networks system records the response as incorrect 1140. This occurs because the user did not follow the prescribed timing specificity parameters. The training system continues evaluating the remainder of the responses till all the responses are categorized 1150

FIG. 12 is a collection of screenshots of the inhibition of response Cognitive Task. In FIG. 12A, the user is presented with the non-response stimulus 1210 with the dotted box designating that the number 9 is the non-response stimulus. Attentional control training commences after the user is presented with the non-response stimulus 1210. In FIG. 12B, the user is presented with a stimulus 1220. In this particular screenshot FIG. 12B, the user is presented with a stimulus 1220 which requires the user to recognize the stimulus as requiring action and tap the screen. The training system then displays a new stimulus as shown in FIG. 12C. In this particular screenshot FIG. 12C, the user is presented with the non-response stimulus 1230 which requires the user to recognize the stimulus as not requiring action and not tap the screen. FIG. 12D completes the collection of screenshots. In this particular screenshot FIG. 12B, the training system again displays a stimulus 1240 which requires the user to recognize the stimulus as requiring action and tap the screen.

FIG. 13 is a collection of screenshots describing the low variance of response time training task. In FIG. 13A, the stimulus, or firefly, 1310 enters from the lower left corner of the screen. The arrow 1320 depicts the path of the firefly 1310 while the firefly is visible on the screen. Although no actual arrow 1320 is displayed during the Cognitive Task training, the firefly 1310 flies along a predetermined path 1320 until it reaches the target area 1330. When the firefly 1310 reaches the target area 1330, the user taps the net located in the lower area of the screen 1305. As the user correctly catches the fireflies 1310 in the target area 1330, the display at the top of the screen 1308 displays how many fireflies 1310 the user has correctly caught in the target area 1330. FIG. 13B shows the firefly 1310 further along the flight path as depicted by the arrow 1320. The display at the top of the screenshot 1308 shows that the user has correctly captured one firefly 1310. FIG. 13C depicts another aspect of the low variance of response training task. In this particular screenshot FIG. 13C the firefly 1310 had previously disappeared, meaning the stimulus was no longer visible, and was traveling along the path as depicted with a dotted arrow 1340. The user maintains attention on the Cognitive Task and determines when the firefly 1310 passes through the target area. The screenshot FIG. 13C further shows that the user correctly captured the firefly 1310. The meter located in the upper portion of the screen 1308 shows that the user correctly captured the firefly 1310 by displaying the white dot in the lighter green portion located above the "Got'em!" label. FIG. 13D is a screenshot of what happens when the user's response is too slow. The firefly 1310 was invisible, although visible in FIG. 13D for demonstration purposes only and not actually seen during training, and flying along a path as depicted by the dotted arrow 1340. The firefly 1310 is outside of the target area and has flown past the target area. The meter in the upper portion of the screen 1308 shows what happens when the user does not correctly capture the firefly 1310 and is too slow. The white dot is no longer in the lighter green section but has progressed into the dark green section and closer to the "Too slow" label.

Figure 14B:
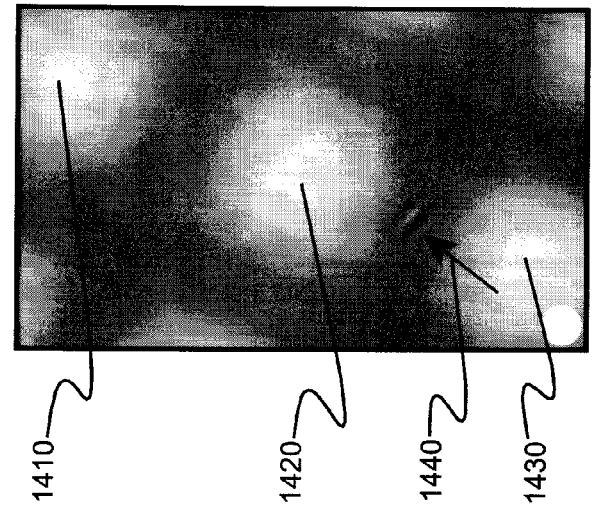
FIG. 14 is simulated screenshots of the timing specificity in a Cognitive Task.
Figure 14A:
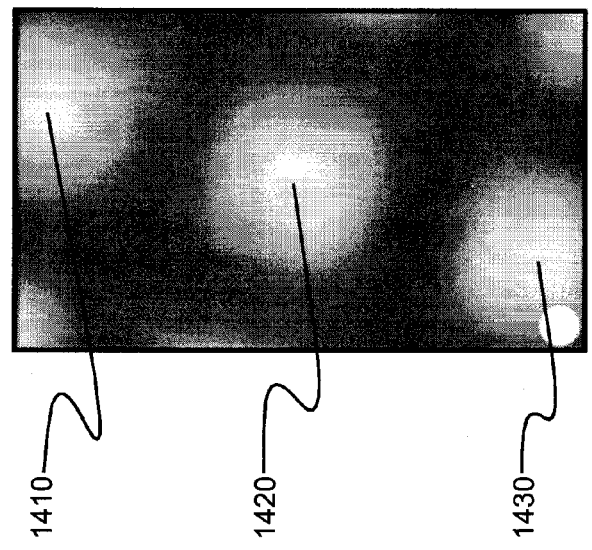

FIG. 14 is a collection of screenshots describing the timing specificity Cognitive Task. FIG. 14A shows the screen of the training task before any stimulus is displayed. The display screen is a contrast between the blue background and the diffuse white dots 1410, 1420, and 1430. The pattern created by the diffuse white dots 1410, 1420, and 1430 and the blue background produce less eye strain when viewing for extended period of time. FIG. 14B depicts what the screen looks like when a near-threshold stimulus, or Gabor patch, is displayed. The arrow 1440 is pointing directly at the near-threshold stimulus, or Gabor patch. When the user perceives a near-threshold stimulus 1440, the user registers the near-threshold stimulus 1440 and taps the screen.

In sum, the present invention provides a system and methods for training Meta-attention. The advantages of such a system include the ability to determine an individual's level of Meta-attention and provide tools for increasing the individual's control of the Meta-attention. This invention is an invaluable resource for individuals with attention disorders to learn how to better control their attention disorders.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

For clarity, below is glossary of terms.

GLOSSARY

Continuous Performance Task, or CPT, is a psychological task that measures a person's sustained and selective attention and impulsivity. A person performs the task for a sustained period (usually several minutes) while stimuli are delivered "continuously" without a break, and each stimulus is evaluated and the person either responds or withholds responses.

Selective attention is the preferential cognitive processing of relevant information over irrelevant information and activation of task-appropriate responses without distraction or interruption. Selective attention can be thought of as being focused on one task to the exclusion of external or internal distractions or interruptions.

Sustained attention is the ability to maintain a consistent focus on an activity or task (i.e., to maintain selective attention). To maintain a consistent level/quality of selective attention during a task without being distracted.

Distraction is an unintentional movement of attention away from the intended focus that is caused by task irrelevant thoughts (internal distractors) or environmental events (external distractors). Anything that competes for cognitive resources related to selective attention is considered a distractor.

Interruption is when thoughts or external events are at sufficient priority to cause an individual to decide if they should switch their focus from their current task to the interruption for a period of time.

Attentional control refers to a person's ability to volitionally control task appropriate focus, switching and sustaining of attention.

Self-directed behavior is when an individual specifically exercises attentional control. This implies a closed-loop control where the individual monitors their actions and the consequences of those actions and can apply attentional control to the task to modify their behavior.

Switching is when an individual's task-specific focus is redirected to a different task, either voluntarily or involuntarily.

Uncontrolled behaviors are those actions where an individual's specific attentional control lapses and their attention is captured by external or internal inputs with little regard to consequence. Internal inputs include but are not limited to mind wandering and rumination. External inputs include exciting graphics, games, motion pictures, noises and voices, threats, etc. Uncontrolled behaviors can be thought of as open-loop control where the individual is only partially monitoring either their actions or the consequences of those actions and cannot apply attentional control to the task to modify their behavior.

Impulsivity is the inclination of an individual to initiate behavior without adequate forethought as to the consequences of their actions, acting on the spur of the moment.

Focus is the quality of a person's attentional control to appropriately accomplish a task. Focus can be directed to task-related information that can be external, internal or both. Attentional quality can either be narrow, such as attending to a specific object in a scene, or broad, such as attending to multiple objects in a scene.

Awareness of attention or Meta-attention refers to an individual's knowledge of the factors that influence their attention and a continuous awareness of their dynamic attentional control. Knowledge and/or awareness, along with training, are required for improving Meta-attention and are driven by experience and reflection in combination with feedback.

Feedback is any type of information presented to an individual representing or interpreting their activities and may be presented synchronously or asynchronously with respect to those activities.

Attention altering tasks are those that are designed to move an individual from one state of attention to another. These tasks may be used as an intervention for undesirable attentional states (e.g., rumination).

Cognitive Tasks are designed to improve a person's Meta-attention and/or attentional control.

Generalization is the ability of an individual to apply the attentional control developed through training on one set of tasks to other (non-trained) tasks throughout their daily life.

Near Threshold Stimulus, or NTS, is a stimulus that is slightly above a person's perceptual threshold (i.e., the level of stimulus salience that is just enough to be perceived).

Stimulus is an object in any sensory domain that can be perceived by an individual.

Task is any set of stimuli and related cognitive activities that require cognitive or behavioral responses by an individual.

Non-compelling tasks are those that require self-directed behaviors to complete. Typically these tasks are built from stimuli that are not salient enough to capture selective attention through uncontrolled behavior. The tasks or stimuli provided in themselves do not cause an individual to allocate attention.

Compelling tasks are those tasks or stimuli that capture and drive selective attention through uncontrolled behavior.

Current state represents the object of an individual's selective and sustained attention.

Driven attention tasks have stimuli or activities that are the source of continuously maintaining an individual's selective attention at a high level on the task.

TNI attention training uses non-compelling stimulus/task parameters that require the individual to be the primary source of continuously maintaining selective attention at a high level on the task.

What is claimed is:

1. In a computerized meta-attention trainer, a computerized training method for enhancing meta-attention of a user, the method comprising:
   presenting a user with a cognitive task via a user interface of a computerized meta-attention trainer, wherein the cognitive task includes a stimuli and the task specifies a desired response to the stimuli;
   assessing attentional control of the user in relation to the cognitive task via the user interface of the computerized meta-attention trainer;
   providing at least one of an instruction and a feedback via the user interface of the computerized meta-attention trainer, based on the attentional control assessment, to the user, thereby enabling the user to reflect on the meta-attention of the user; and
   wherein the stimuli is presented at a plurality of random inter-stimulus intervals (ISI), and wherein the random inter-stimulus intervals are substantially between a reaction-reset interval and an attention-sustaining interval, thereby improving the user's meta-attention including knowledge of factors that influence the user's attention and an awareness of the user's attentional processes as they occur and improving the user's attentional control.

2. The training method of claim 1 wherein the attention-sustaining interval is adjusted to suit the user.

3. The training method of claim 1 wherein the stimuli is attentionally demanding and non-compelling.

4. The training method of claim 1 wherein a difficulty level of the cognitive task is adjusted in response to an accuracy rate of the user.

5. The training method of claim 1 further comprising providing at least one distractor.

6. The training method of claim 5 wherein the at least one distractor has a similar modality as the stimuli.

7. The training method of claim 5 wherein the at least one distractor has a different modality as the stimuli.

8. The training method of claim 5 wherein the at least one distractor provides a trigger for initiating an internal thought process of the user.

9. The training method of claim 1 wherein a difficulty level of the cognitive task is calibrated according to a performance level of the user on the cognitive task.

10. The training method of claim 1 further comprising instructing the user to internally reflect thereby enabling the user to enhance the meta-attention of the user on the task.

11. In a computerized meta-attention trainer, a computerized method for training attentional control, the method comprising:

presenting a user with a stimuli via a user interface of a computerized meta-attention trainer, wherein the stimuli requires a specified response from the user, and wherein the response requires specific attentional control;

assessing attentional control of the user in relation to the stimuli via the user interface of the computerized meta-attention trainer; and wherein the stimuli is presented at a plurality of random inter-stimulus intervals (ISI), and wherein the random inter-stimulus intervals are substantially between a reaction-reset interval and an attention-sustaining interval, thereby improving the user's awareness of the user's attentional processes as they occur and improving the user's attentional control.

12. The training method of claim 11 wherein assessing attentional control of the user includes assessing at least one of
speed of response of the user to the stimuli,
accuracy of response of the user to the stimuli,
consistency of response of the user to the stimuli,
adjustment speed of the response of the user to the stimuli,
response of the user to at least one contingency, and
allocation of attention of the user to the stimuli.

13. The training method of claim 11 further comprising providing feedback based on a performance of the user thereby enabling the user to enhance the attentional control of the user.

14. The training method of claim 11 wherein the stimuli is at least one of a visual stimuli, an audible stimuli, and a tactile stimuli.

15. A computerized meta-attention trainer configured to enhance meta-attention of a user, the trainer comprising:
a user interface having a display device configured to present a user with a cognitive task, wherein the cognitive task includes a stimuli and the task specifies a desired response to the stimuli;
a processor configured to assess attentional control of the user in relation to the cognitive task and further configured to generate at least one of an instruction and a feedback, based on the attentional control assessment, to the user, thereby enabling the user to reflect on the meta-attention of the user; and
wherein the stimuli is presented at a plurality of random inter-stimulus intervals (ISI), and wherein the random inter-stimulus intervals are substantially between a reaction-reset interval and an attention-sustaining interval, thereby improving the user's meta-attention including knowledge of factors that influence the user's attention and an awareness of the user's attentional processes as they occur and improving the user's attentional control.

16. The trainer of claim 15 wherein the attention-sustaining interval is adjusted to suit the user.

17. The trainer of claim 15 wherein the stimuli is attentionally demanding and non-compelling.

18. The trainer of claim 15 wherein a difficulty level of the cognitive task is adjusted in response to an accuracy rate of the user.

19. The trainer of claim 15 wherein the display device is further configured to present at least one distractor to the user.

20. The trainer of claim 19 wherein the at least one distractor has a similar modality as the stimuli.

21. The trainer of claim 19 wherein the at least one distractor has a different modality as the stimuli.

22. The trainer of claim 19 wherein the at least one distractor provides a trigger for initiating an internal thought process of the user.

23. The trainer of claim 15 wherein a difficulty level of the cognitive task is calibrated according to a performance level of the user on the cognitive task.

24. The trainer of claim 15 the processor is further configured to instruct the user to internally reflect thereby enabling the user to enhance the meta-attention of the user on the task.

25. A computerized meta-attention trainer configured to train attentional control, the trainer comprising:
a user interface having a display device configured to present a user with a stimuli, wherein the stimuli requires a specified response from the user, and wherein the response requires specific attentional control;
a processor configured to assess attentional control of the user in relation to the stimuli; and
wherein the stimuli is presented at a plurality of random inter-stimulus intervals (ISI), and wherein the random inter-stimulus intervals are substantially between a reaction-reset interval and an attention-sustaining interval, thereby improving the user's awareness of the user's attentional processes as they occur and improving the user's attentional control.

26. The trainer of claim 25 wherein assessing attentional control of the user includes assessing at least one of
speed of response of the user to the stimuli,
accuracy of response of the user to the stimuli,
consistency of response of the user to the stimuli,
adjustment speed of the response of the user to the stimuli,
response of the user to at least one contingency, and
allocation of attention of the user to the stimuli.

27. The trainer of claim 25 wherein the processor is further configured to generate feedback based on a performance of the user thereby enabling the user to enhance the attentional control of the user.

28. The trainer of claim 25 wherein the stimuli is at least one of a visual stimuli, an audible stimuli, and a tactile stimuli.

29. In a computerized meta-attention trainer, a computerized method for training attentional control of a user, the method comprising:
presenting a user with a cognitive task via a user interface of a computerized meta-attention trainer, wherein the cognitive task includes a stimuli and the task specifies a desired response to the stimuli;
assessing attentional control of the user in relation to the cognitive task via the user interface of the computerized meta-attention trainer;
providing at least one of an instruction and a feedback via the user interface, based on the attentional control assessment, to the user, thereby enabling the user to reflect on the meta-attention of the user; and
wherein the stimuli is presented at a plurality of random inter-stimulus intervals (ISI), and wherein the random inter-stimulus intervals are substantially between a reaction-reset interval and an attention-sustaining interval, thereby improving the user's awareness of the user's attentional processes as they occur and improving the user's attentional control.

30. The method of claim 29 wherein the desired response from the user includes maintaining a consistent response-time to the presentation of the stimuli.

31. The method of claim 29 wherein desired accuracy of a response-time to the stimuli is adjusted to increase difficulty of the cognitive task thereby requiring greater accuracy demands as the attentional control of the user improves.

* * * * *